Aug. 21, 1962 R. HUBER 3,049,866
POWER PLANTS COMPRISING AT LEAST ONE FREE-PISTON GAS-GENERATOR AND A GAS TURBINE
Filed Nov. 1, 1960
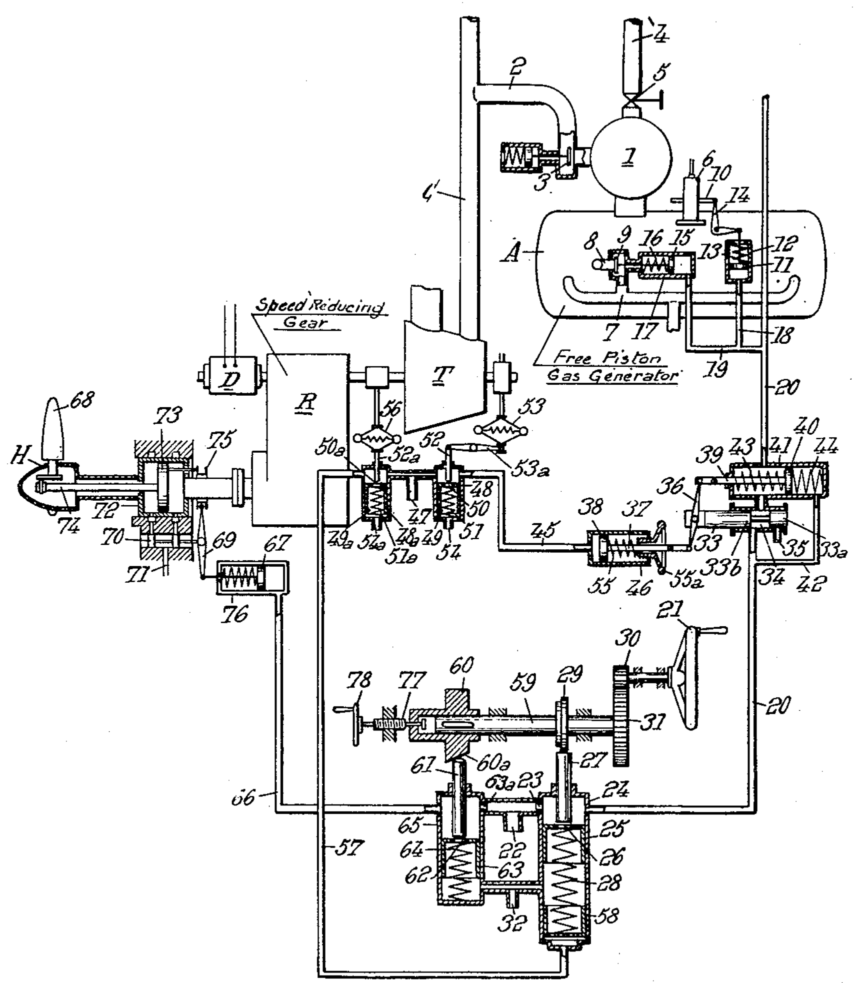
ROBERT HUBER INVENTOR
BY Bailey, Stephens & Huettig
ATTORNEY United States Patent Office 3,049,866

Patented Aug. 21, 1962

3,049,866

POWER PLANTS COMPRISING AT LEAST ONE FREE-PISTON GAS-GENERATOR AND A GAS TURBINE

Robert Huber, Bellevue, France, assignor to Societe d'Etudes et de Participations Eau, Gaz, Electricite Energie S.A., Geneva, Switzerland, a Swiss society Filed Nov. 1, 1960, Ser. No. 66,476
Claims priority, application France Nov. 5, 1959
11 Claims. (Cl. 60—13)

The present invention relates to power plant comprising at least one free-piston gas-generator and a gas turbine driven by the power gas delivered by the gas-generator and it concerns more particularly, but not exclusively, installations of this kind intended to drive a ship's propeller.

Generally, the power of such plant is regulated in the higher load region solely by varying the quantity of fuel fed to the combustion cylinder of the gas-generator, while in the low-load region of the plant, or when idling, both the quantity of fuel and the quantity of gas delivered are varied, the latter by allowing a part of this gas or the air compressed by the compressor part of the gas-generator to exhaust into atmosphere, or by re-cycling in the compressor part, or towards the admission to the latter, a part of the air already previously compressed.

Furthermore, there has also been provided in such power plant a safety device which stops the gas-generator in the case of excessive turbine speed.

When such a power plant is one of which the power is regulated by a control member adjusted by the attendant of the plant at will, it has been found that the safety device becomes operative too often and necessitates too frequent restarting of the gas-generator. This occurs more particularly when the power plant concerned is a marine power plant, that is to say a power plant for the propulsion of a ship. In fact, in such an application, the load under which the plant operates is subject to considerable and rapid variations, especially in bad weather, because the propeller driven by the plant concerned then often leaves the water, resulting in a very considerable and rapid diminution in the resistance which is generally opposed to its rotation, this diminution being accompanied by a rapid increase in the speed of the propeller and of the turbine which drives it. It is then very inconvenient that the gas-generator and with it the turbine, i.e. the entire propulsion unit, should be stopped by the intervention of said safety device, since the ship then loses its ability to manoeuvre.

It is one of the objects of the present invention to provide a power plant in which the speed of the turbine is prevented from exceeding a predetermined limit without the propulsion unit thereby being stopped.

On the other hand, it may happen that the attendant of the plant adjusts the control member in a position for which the turbine would fall below a minimum speed and would stop. Therefore, another object of the invention is to prevent the turbine speed from falling below said minimum speed.

According to the present invention, there is provided a power plant comprising at least one free-piston gas-generator and a gas turbine arranged to be driven by gas from the gas-generator, and comprising main control means, including a control member operable by an attendant of the plant, for adjusting the output of gas from the gas-generator, wherein there are provided further control means operating in dependence upon the speed of the turbine, upon the said main control means in such a manner that when the turbine speed exceeds a predetermined value the said output of gas is reduced independently of the setting of the control member and/or when the turbine speed falls below a predetermined limit, the said output of gas is increased independently of the setting of the control members.

The invention will be described, by way of example, with reference to the accompanying drawing.

The single FIGURE of the drawing shows diagrammatically a power plant according to the present invention for driving the variable-pitch propeller of a ship.

The power plant comprises one or preferably a plurality of free-piston gas-generators A adapted to be connected to a main pipe C, which conducts the power gas delivered by the gas-generator or generators to the inlet of a gas turbine T, said turbine driving by means of a reducing device R the propeller H of a ship.

The gas-generator A may be constructed in any desired manner, with the exception of its control system. Thus, it may be provided, as usual, with two sets of oppositely moving pistons, the parts of which forming the combustion pistons operating in a common combustion cylinder, while the parts forming the compressor pistons, operate in compressor cylinders arranged on either side of the combustion cylinder.

Such constructions are known to persons versed in the art and do not require to be described or illustrated in the drawing.

The power gas produced by this gas-generator is first of all delivered to a collector 1 forming part of said gas-generator, this collector being connected, on the one hand to the common main C by a pipe 2 in which is included a non-return valve 3 and, on the other hand, to the atmosphere by means of an exhaust pipe 4, including a valve 5. Except during starting of the corresponding gas-generator, this valve 5 is shut.

Furthermore, each gas-generator of the plant is provided with an injection pump 6 for fuel, the regulation of which will be explained hereinafter.

In addition, the gas-generator is provided with means which, for low loads of the installation, permit an excess of gas or air under pressure, which excess could then not be absorbed by the turbine, either to exhaust into the atmosphere, or as assumed in the installation shown in the figure, to be used for heating the fresh air drawn from the atmosphere by the compressor cylinders and which enters the latter by way of a suction pipe 7. For this recycling of an excess of hot, compressed air, there is provided on the outer casing of the gas-generator, which casing serves as a compressed-air reservoir, between the compressor cylinders and the combustion cylinder an outlet pipe 8 which connects the interior of this casing to the suction pipe 7, and which includes a lift valve or shut-off controlled, as will likewise be explained hereinafter, in such a manner that it can open for low loads of the plant, the degree of opening being the greater the lower is the loading of the plant.

It should here be noted that a recycling device of this kind is described in more detail in the patent application Ser. No. 779,201, filed on December 9, 1958, now Patent No. 2,954,761.

Referring now to the regulating means which control, on the one hand, the member 10 of the injection pump, the position of which determines the quantity of fuel delivered by this pump, said member consisting for example of a rack which rotates the injection pump piston on its axis, and on the other hand, the recycling valve 9, they are arranged in known manner such that they produce in a fluid, usually a liquid, pressure variations which are a function of the load of the installation and which, in so far as concerns the control of the injection pump regulating member 10, act on a piston 11 moving in a cylinder 12 against the action of a spring 13 and connected to the member 10 by a bell crank 14. Known means, not shown, may also be provided for limiting the possible movements of the member 10 as a function of the working pressure of the gas-generator. In regard to the control of the valve 9, said control fluid variations act on a piston 15 connected to said valve and moving against the action of a spring 16 in a cylinder 17. The two cylinders 12 and 17 are connected by pipes 18 and 19 to a common pipe line 20, supplying the control liquid, the pressure of which is the higher the greater the load of the plant.

During normal operation of the power plant, its load, corresponding to the power with which the propeller H is to be driven, is regulated by the attendant of the plant who operates for example a hand wheel 21, and by turning this hand wheel adjusts the pressure of the control fluid in the pipe line 20 to the desired value.

For supplying the pipe line 20 with fluid, such as a liquid, under pressure, the pipe line is connected by a supply pipe 22 to a source not shown (tank, constant-delivery pump or the like) of a fluid under pressure. Furthermore, between the supply pipe 22 and the pipe line 20 is a calibrated orifice 23 and a cylinder 24. Operating in this latter cylinder is a piston 25, the end of which is provided with an escape orifice 26 controlled by a plunger 27, a spring 28 acting on the piston 25 from the side opposite to that of the plunger 27, urging the part of the end of the piston 25 containing the orifice 26 against the end of said plunger.

The position of the plunger 27 inside the cylinder 24 is controlled by a cam rotated, by means of two gear wheels 30, 31, by the hand wheel 21 operated by the attendant of the plant. The lower the plunger 27 descends in the cylinder 24, the greater is the compression of the spring 28 by the piston 25, this compression determining the pressure of the liquid entering the cylinder 24 and the pipe line 20. This pressure is that necessary to separate the end of the piston 25 from the end of the plunger 27 and thus to permit the liquid arriving by the supply pipe 22 to escape through the orifice 26 and to return to the liquid tank by a discharge pipe line 32.

It will, therefore, be seen that the pressure of the fluid in the pipe line 20 depends upon the position which the attendant of the plant gives to the hand wheel 21. For low loads, the pressure is reduced, causing the rack 10 of the injection pump 6 to move in a direction resulting in a diminution in the quantity of fuel injected and causing the valve 9 to move to the right, establishing communication between the pipes 8 and 7. If the load, that is to say the power required of the plant, rises, the rack 10 is moved to the left to increase the quantity of fuel injected, while from a predetermined intermediate load upward, this pressure by acting on the piston 15 closes the valve 9. From that moment, all the gas produced by the gas-generator serves to feed the turbine T.

It should here be noted that in a power plant comprising a plurality of free-piston gas-generators A, a single pipe line 20 may serve for controlling the pistons 11 and 15 of each of these gas-generators. To indicate this, the pipe line 20 has been extended in the drawing beyond the place where the pipes 18 and 19 of the gas-generator A shown in this figure are connected to the pipe line 20.

In a power plant which comprises only the regulating means which have just been described, it may happen fairly frequently that the speed of rotation of the turbine exceeds the permissible limit, owing to an abrupt reduction in the load under which the plant is operating. This abrupt reduction occurs, for example, when owing to bad weather and very heavy seas, the propeller leaves the water. In order, in such circumstances, to prevent racing of the turbine, there is provided between the members which are actuated by the control member 21 operated by the attendant for producing a definite pressure in the pipe line 20 and the elements (pistons 11 and 15) which are controlled by the pressure of the control liquid in the pipe line 20, a pressure-reducing device controlled by a speed governor driven by the turbine, this device and governor operating in such a manner that from a certain turbine speed upward and independently of the position of the control member 21, the pressure acting on the pistons 11 and 15 is reduced.

The pressure-reducing device may be constructed in various ways. It appears, however, to be particularly advantageous to construct it in such a manner that when the turbine speed exceeds a predetermined value, it first of all separates the two sections of pipe line 20 upstream and downstream of the pressure-reducing device and connects the latter section to an exhaust pipe ensuring immediately a considerable pressure drop in this section, and consequently in the cylinders 12 and 17 in which move the pistons 11 and 15, while once this pressure drop in the section of pipe line 20 downstream of the pressure-reducing device has occurred, the latter device returns slightly to the rear to maintain a certain pressure drop between the two upstream and downstream sections until the turbine speed returns to normal.

For this purpose, the active member of the pressure-reducing device may have the form of a slide valve 33, provided with a throat 34 which, in a first position (that shown in the figure) puts into free communication, that is to say without any constriction, the sections of the pipe line 20 which are upstream and downstream of the pressure-reducing device, and which in a second position, reached after having been moved to the right in the drawing, closes the upstream section of the pipe line 20 and connects the downstream section of this pipe line to an exhaust pipe 35, while in an intermediate position, this slide valve partly closes with its part $33_a$ the exhaust pipe 35, and constricts by its part $33_b$ the pipe line 20.

In order to control the slide valve 33 as indicated in the foregoing, it is pivoted to a two-armed lever 36 at a point situated between the ends of this lever. Furthermore, the rod 37 of a piston 38 is connected to one of the ends of this lever, and a control fluid is caused to act on the piston 38 with a pressure which is a function of the speed of the turbine T. Finally, there is connected to the other end of the lever 36 the rod 39 of a piston 40 operating in a cylinder 41 and subject, on one side, to the action of the pressure prevailing in the upstream section of the pipe line 20 and supplied to this piston by a pipe 42, and on its other side, to the action of the pressure prevailing in the downstream section of the pipe line 20. Furthermore, the piston 40 is balanced by springs 43, 44 acting on its two opposite sides.

The means for varying the pressure of the control fluid acting on the piston 38 and admitted by a pipe line 45 to a cylinder 46 in which the piston 38 operates, are advantageously constructed as follows:

The pipe line 45 is supplied with fluid, such as a liquid under pressure, from a source not shown, which may be the same as that supplying the pipe line 20, and which is connected to the pipe line 45 by a pipe line 47. Furthermore, there is included between the pipe line 47 and the pipe line 45 a cylinder 48, in which operates a piston 49 having an orifice 50 in its end and urged by a spring 51 against a plunger 52 which by means of a lever $53_a$ is displaced by a speed governor 53 driven by the shaft of the turbine T. The liquid passing through the orifice 50 is discharged by a pipe 54. The higher the speed of the turbine, the greater the extent to which the plunger 52 enters the cylinder 48 and the greater is the increase in the pressure of the control fluid in the pipe line 45. The operation of the elements 48 to 52 is thus analogous to that of the hereinbefore described elements 24 to 28.

When the turbine speed tends to exceed the maximum permissible speed, the pressure in the pipe line 45 becomes high enough to commence to move the piston 38 to the right in its cylinder 46, this piston, at lower turbine speeds and liquid pressures, having been maintained in its rest position by a spring 55 appropriately pre-stressed and adjustable by the attendant, for example by means of a hand wheel $55_a$.

The operation of the speed-reducing device is then as follows:

As long as the control liquid, before movement of the piston 38, has been able to flow freely through the throat 34 and the slide valve 33, movement of the piston 38 to the right likewise moves the slide valve 33 to the right, and thus interrupts communication between the upstream and downstream sections of the pipe line 20 and brings the downstream section into communication with the discharge pipe 35. The pressure in the upstream section remains unaltered, but the pressure in the downstream section diminishes, this diminution in pressure acting immediately on the pistons 11 and 15. Furthermore, the pressure difference thus produced between the upstream and downstream sections of the pipe line 20 acts on the piston 40, so that the latter is moved to the left, carrying with it the slide valve 33 likewise to the left. This, while re-establishing communication between the upstream and downstream sections, produces however a pressure drop which is maintained as long as the turbine T runs at a speed higher than its normal speed. It will be seen that to each position of the piston 38, there corresponds a position of the piston 40, that is to say, that to each pressure in the pipe line 45 there corresponds a pressure drop in the pipe line 20 through the pressure-reducing device. If the speed is increased, this device therefore reduces the power of the gas-generator or generators by reducing the pressure of the control liquid downstream of the reducing device, regardless of the pressure in the upstream section of the pipe line 20 at the moment of intervention of said pressure-reducing device. This pressure-reducing device, therefore, has a corrective effect on the control member operated by the attendant of the plant, this corrective effect preventing the turbine T from exceeding its upper speed limit, even in the case of abrupt change in its load.

It is also very important to be able to adjust the prestressing of the spring 55. In fact, in normal conditions, the adjustment is made such that the pressure reducing device begins to act at speeds which are slightly higher, for example by 2 or 3%, than the normal maximum speed. It is, however, necessary that its action should be sufficiently effective before the turbine attains the speed which releases the safety device (not shown), producing the stopping of the gas-generator or generators and normally adjusted to operate at a speed 10% higher than the maximum normal speed of the turbine. There remains, therefore, a margin of 7 to 8% for the pressure-reducing device to intervene so as to avoid release of the safety device.

In bad weather, the ship will steam at reduced speed, and the turbine will run for example at 80% of its normal maximum speed. It will therefore be advantageous to cause the pressure-reducing device to become operative not at a speed which is 102 to 103% of the said normal maximum speed, but at a speed slightly higher than the actual speed, which in the circumstances indicated is only 80% of the normal maximum speed. It is then advantageous to cause the pressure-reducing device to function at a turbine speed which is 82 to 85% of the normal maximum speed of the turbine. In such a case, there is obtained a much greater divergence between the entry into action of the pressure-reducing device provided according to the invention and the entry into action of the safety system which stops the gas-generators. This can be effected by adjustment of the preliminary tension of the spring 55 by means of a hand wheel $55_a$.

It will either be considered sufficient to proceed as just described, or better still, recourse will be had to one of the following arrangements.

According to one of these other arrangements, the speed of the turbine T is prevented from falling below a minimum speed by effecting the control, as a function of the turbine speed, of a device which, when the turbine speed approaches its lower limit, produces an increase in the pressure of the control fluid acting on the regulating elements (pistons 11 and 15) independently of the position occupied by the control member 21, this increase in pressure producing a regulation of the gas-generator such as to increase its power.

It should here be noted that this latter arrangement is particularly important when the turbine T drives in addition to the propeller of a ship also an alternator or dynamo D for producing electricity on board and whereof the driving speed, on which the voltage of the dynamo depends, should not fall below a certain value. The application of this arrangement is likewise useful if the whole of the rotary unit (turbine T, reducing gear R, propeller H, possibly including also the dynamo D) possesses critical torsion speeds below the normal running speed. By preventing the turbine speed from dropping below a predetermined value, it is then possible to avoid causing the plant to operate in conditions corresponding to a critical speed of the revolving shafts.

Although this arrangement can be realized in various ways, it appears particularly simple, when the speed of the turbine T tends to fall below a certain predetermined value, to increase the compression of spring 28 which, in combination with the position of the plunger 27, determines the pressure of the control fluid in the pipe line 20. For this purpose, there is provided a second governor 56, likewise driven by the turbine T and producing, in combination with a device $48_a$, $49_a$, $50_a$, $51_a$, $52_a$, $54_a$, analogous to the hereinbefore described device 48, 49, 50, 51, 52, 54, a variation of pressure in a pipe line 57, likewise fed from the pipe 47 and opening into the cylinder 24 below the piston 58 forming a support for the end of spring 28 opposite to that acting on the piston 25. Of course, the transmission between the speed governor 56 and the plunger $52_a$ is such, for example direct, that this plunger in cooperation with the spring $50_a$ produces in the pipe line 57 a fluid pressure which becomes greater as the speed of the turbine T falls below a certain value, while the pressure in the pipe line 57 is negligible or zero as long as the turbine runs at a speed above said value.

According to a modification, it is possible to use one and the same speed governor for controlling the two plungers 52 and $52_a$. In this case, it is necessary to establish between this single governor and these plungers transmissions which produce oppositely directed movements of these plungers.

In another arrangement, which is applicable to marine installations comprising a variable pitch propeller, there is likewise utilized for producing this variation in pitch, a control liquid under pressure, and the pressure of this liquid is caused to be varied by the same control member 21 which likewise produces a variation in pressure in the pipe line 20 supplying control fluid to the regulating elements of the gas-generator or generators of the plant. There is thus mounted on the shaft 59, on which is mounted the cam 29 driven by the hand wheel 21, a second cam 60 acting on a plunger 61 co-operating with an orifice 62 in the bottom of a piston 63, which is applied against said plunger by a spring 64, these elements 61 to 64 being mounted in the interior of a cylinder 65. This cylinder is interposed in a pipe line 66 supplied with fluid under pressure from a pipe 22. The pressure in line 66 may be different from that in line 20, although both of these lines are fed from the same conduit 22, because cylinder 65 is connected with conduit 22 through a calibrated orifice $65_a$ which may be of a diameter different from that of the calibrated orifice 23 through which cylinder 24 communicates with conduit 22. Furthermore, the compartment of the cylinder which is behind the orifice 62 is connected to the discharge pipe 32, in the same manner as the cylinder 24.

When the shaft 59 is rotated, the pressure of the control liquid in the pipe line 66 is thus varied. This control liquid acts on a piston 67 which, by means of a known servo-motor device, produces the change in pitch of the blades 68 of the propeller H.

This servo-motor device may comprise a two-armed lever 69 pivoted between its ends to a slide valve 70 which, according to its position, sends fluid under pressure, for instance oil, supplied by a duct 71, into one or the other of the two compartments of a cylinder 72, which is divided into these two compartments by a piston 73. This piston 73, by displacement in its cylinder, produces on the one hand the change in pitch of the blades 68 by means of a rod 74 connected to each of the blades by a known appropriate kinematic device, and on the other hand, displaces a ring 75 comprising a groove engaged by one of the ends of the lever 69, while its other end is connected to the piston 67 under the action of an opposing spring 76. For each pressure of the control liquid in the pipe line 66, which pressure depends upon the position of the hand wheel 21, there is obtained a definite pitch of the blades 68 by the means just described, the operation of which does not require detailed explanation.

According to a preferred embodiment of the invention, means (screw 77, hand wheel 78) are also provided for varying the axial position of the cam 60 on the shaft 59, and the active surface $\mathbf{60_a}$ of the cam is inclined to the axis of the cam, so that by axial displacement of this cam, its effect may be regulated.

Advantageously, the active surfaces of cams 29 and 60 are so constructed that when the shaft 59 is moved from its neutral position in the direction for movement ahead or movement astern, through an angle which, for the regulation of the gas-generators, still corresponds to idling or running under very low power, the cam 60 produces for the two directions of movement a variation in pitch of the blades from minimum value to its maximum value. Then, when said angle corresponding to idling or running at very low power of the gas-generators is exceeded in order to increase their power and that of the turbine, the cam 60 merely keeps the pitch of the blades at its maximum value.

What I claim is:

1. A power plant which comprises, in combination, at least one free piston gas generator having a combustion chamber, an outlet for power gas and means for regulating the exhaust of compressed gas from said generator, a gas turbine having a power gas intake, gas conveying means extending from said generator outlet to said turbine intake, main control means for adjusting the output of power gases from said generator, said control means including a manually operated movable control member, and further control means operatively connected with said main control means for varying the action thereof on said power gas output without ever making this output equal to zero, said further control means being responsive to variation of said turbine speed beyond a predetermined value, independently of the setting of said control member, the power gas output variation produced by said further control means being in a direction opposed to the turbine speed variation in response to which it takes place.

2. A power plant which comprises, in combination, at least one free piston gas generator having a combustion chamber, an outlet for power gas and means for regulating the exhaust of compressed gas from said generator, a gas turbine having a power gas intake, gas conveying means extending from said generator outlet to said turbine intake, control means for adjusting the output of power gases from said generator, fluid pressure responsive means for operating said control means to increase said power gas output in response to an increase of said fluid pressure and to reduce said output in response to a decrease of said fluid pressure, a source of fluid under pressure, means including a manual control member for varying the fluid pressure transmitted from said source to said last mentioned means in accordance with the position of said control member and further control means for varying said fluid pressure independently of the position of said control member and in response to variation of said turbine speed beyond a predetermined value, the fluid pressure variation produced by said further control means being in a direction opposed to the turbine speed variation in response to which it takes place and never making the power gas output equal to zero.

3. A power plan according to claim 1, wherein said main control means is arranged to vary the supply of fuel to said combustion cylinder of the gas-generator.

4. A power plant according to claim 1, wherein said main control means is arranged to regulate said exhaust of compressed gas from the gas-generator.

5. A power plant according to claim 1, further comprising means for adjusting said predetermined value of the turbine speed at which said further control means come into operation.

6. A power plant which comprises, in combination, at least one free piston gas-generator having an outlet for a power gas under pressure, a gas turbine having a power gas intake, gas conveying means leading from said generator outlet to said turbine intake, control means for adjusting the output of power gas from said generator, fluid pressure responsive means for operating said control means to reduce said power gas output in response to a decrease of said fluid pressure, a source of fluid under pressure, a pipe line leading from said source to said fluid pressure responsive means, a manual control member, means actuated by said control member and operatively connected with said pipe line for varying the fluid pressure transmitted by said pipe line in accordance with the position of said control member, and a valve member in said pipe line responsive to speed variations of said turbine for reducing the fluid pressure in said pipe line downstream of said valve member in response to an increase of said turbine speed beyond a predetermined value.

7. A power plant according to claim 6, wherein said valve member is a slide valve.

8. A power plant which comprises, in combination, at least one free piston gas-generator having an outlet for a power gas under pressure, a gas turbine having a power gas intake, gas conveying means leading from said generator outlet to said turbine intake, control means for adjusting the output of power gas from said generator, means responsive to a fluid pressure for operating said control means to reduce said power gas output in response to a decrease of said fluid pressure, a source of fluid under pressure, a pipe line leading from said source to said fluid pressure responsive means, a manual control member, means actuated by said control member and operatively connected with said pipe line for varying the fluid pressure transmitted by said pipe line in accordance with the position of said control member, a throttle valve in said pipe line responsive to speed variations of said turbine to be moved in the direction reducing the fluid pressure in said pipe line downstream of said valve in response to an increase of said turbine speed beyond a predetermined value and means for moving said valve in the opposed direction in response to such a reduction of the fluid pressure in said pipe line downstream of said valve with respect to the fluid pressure upstream of said valve.

9. A power plant which comprises, in combination, at least one free piston gas generator having a combustion chamber, an outlet for power gas and means for regulating the exhaust of compressed gas from said generator, a gas turbine having a power gas intake, gas conveying means extending from said generator outlet to said turbine intake, control means for adjusting the output of power gases from said generator, means responsive to a fluid pressure for operating said control means to increase said power gas output in response to an increase of said fluid pressure and to reduce said output in response to a decrease of said fluid pressure, a source of fluid under pressure, means including a manual control member for varying the fluid pressure transmitted from said source to said last mentioned means in accordance with the position of said control member and further control means for reducing said fluid pressure independently of the position of said control member and in response to decrease of said turbine speed beyond a predetermined value, the fluid pressure variation produced by said further control means never making the power gas output equal to zero.

10. A power plant according to claim 9, in which said further control means comprise a pipe line between said source of fluid under pressure and said fluid pressure responsive means, a cylinder communicating with said pipe line, an apertured piston in said cylinder, a plunger in said cylinder, a spring pressing said piston against said plunger, said plunger being operable by said control member and covering the aperture of said piston, and means acting upon said spring and increasing the pressure exerted between said piston and said plunger when the turbine speed falls below the predetermined value.

11. A power plant which comprises, in combination, at least one free piston gas-generator having an outlet for a power gas under pressure, a gas turbine having a power gas intake, gas conveying means leading from said generator outlet to said turbine intake, control means for adjusting the output of power gas from said generator, means responsive to a fluid pressure for operating said control means to reduce said power gas output in response to a decrease of said fluid pressure, a source of fluid under pressure, a pipe line leading from said source to said fluid pressure responsive means, a manual control member, means actuated by said control member and operatively connected with said pipe line for varying the fluid pressure transmitted by said pipe line in accordance with the position of said control member, a throttling valve in said pipe line capable, when in fully closed position, of connecting with the outside the portion of said pipe line downstream of said valve, a fixed cylinder, a piston movable in said cylinder to limit therewith a variable volume chamber, means responsive to the speed of said turbine for feeding said chamber with fluid at a pressure the higher as said speed is higher, yielding means operatively connected with said piston for opposing displacement thereof under the effect of the pressure in said chamber, manual means for adjusting the resistance of said yielding means, means for connecting said valve with said piston so that an increase of the volume of said chamber moves said valve in the closing direction, and fluid operated means responsive to the difference between the pressures in said pipe line upstream and downstream of said valve respectively for moving said valve in the opening direction after it has been closed by the action of said piston.

References Cited in the file of this patent

UNITED STATES PATENTS

| | | |
|---|---|---|
| 2,147,935 | Steiner | Feb. 21, 1939 |
| 2,306,953 | Jung | Dec. 29, 1942 |
| 2,322,522 | Johansson | June 22, 1943 |
| 2,474,697 | Schwendner | June 28, 1949 |
| 2,538,490 | Welsh | Jan. 16, 1951 |
| 2,941,602 | Coar | June 21, 1960 |
| 2,943,438 | Huber | July 5, 1960 |
| 2,949,541 | Addie et al. | Aug. 16, 1960 |
| 2,978,035 | Haworth | Apr. 4, 1961 |